United States Patent
Hsu

(10) Patent No.: US 6,497,316 B1
(45) Date of Patent: *Dec. 24, 2002

(54) POWERED, UNIDIRECTIONAL OUTPUT CONTROLLING APPARATUS

(75) Inventor: Hung-Ming Hsu, Taichung (TW)

(73) Assignee: Mobiletron Electronics Co., Ltd., Taichung Hsien (TW)

( * ) Notice: Subject to any disclaimer, the term of this patent is extended or adjusted under 35 U.S.C. 154(b) by 44 days.

This patent is subject to a terminal disclaimer.

(21) Appl. No.: 09/714,269

(22) Filed: Nov. 17, 2000

Related U.S. Application Data

(63) Continuation-in-part of application No. 09/484,235, filed on Jan. 18, 2000, now Pat. No. 6,279,714.

(51) Int. Cl.$^7$ .......................... B25B 21/00; F16D 15/00
(52) U.S. Cl. .................. 192/223.2; 192/38; 192/44; 173/178; 173/216; 81/57.11
(58) Field of Search ................ 192/223.2, 38, 192/44, 55.2, 55.3, 30 V, 107 T; 188/82.2, 82.84, 134; 173/178, 216, 217; 81/57.11, 57.31

(56) References Cited

U.S. PATENT DOCUMENTS

| | | | | |
|---|---|---|---|---|
| 2,398,261 A | * | 4/1946 | Stone | 192/45 |
| 4,448,098 A | * | 5/1984 | Totsu | 81/467 |
| 5,016,501 A | * | 5/1991 | Holzer, Jr. | 81/57.11 |
| 5,788,021 A | * | 8/1998 | Tsai | 188/67 |
| 5,947,254 A | * | 9/1999 | Jones | 192/223.2 |
| 5,984,022 A | * | 11/1999 | Harman et al. | 173/176 |
| 6,176,801 B1 | * | 1/2001 | Chen | 475/162 |
| 6,279,714 B1 | * | 8/2001 | Hsu | 192/223.2 |

* cited by examiner

*Primary Examiner*—Richard M. Lorence
(74) *Attorney, Agent, or Firm*—Rosenberg, Klein & Lee

(57) ABSTRACT

A powered, unidirectional output controlling apparatus mounted between the main shaft of an electrically powered tool and a power source is provided. The apparatus comprises a rotating seat, a plurality of flexible disc seats made from a rubber material, a locking seat, a plurality of locking rollers and a fixing ring. One end of the rotating seat is engaged with the power source output of a power transmission mechanism and the other end of the rotating seat is provided with a plurality of insertion shafts passing though the locking seat fastened by two flexible disc seats. The locking seat is first mounted into the fixing ring. The center of the rotating seat is provided with a bolt hole for the mounting of the main shaft. The external edge of the fixing ring is secured to the housing of the electrically powered tool. An inner side of the fixing ring is formed with an annular groove into which a rubber ring is disposed. The perimeter portion of he locking seat is provided with a plurality of locking slots and the locking slots are mounted with a plurality of locking rollers. During reverse transmission, the flat bottom surfaces of the locking slots push the locking rollers to engage with a narrow space at the lateral ends of the locking slots, such that the locking rollers engage with the fixing ring and the locking seat.

1 Claim, 4 Drawing Sheets

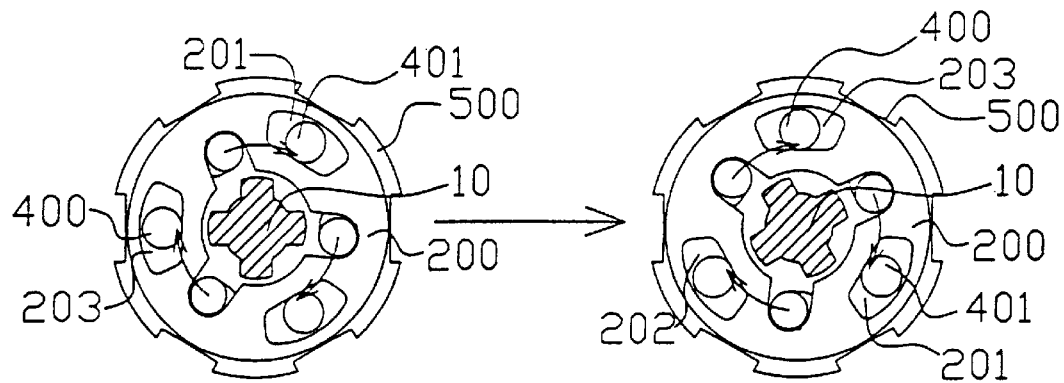
FIG. 4   FIG. 5
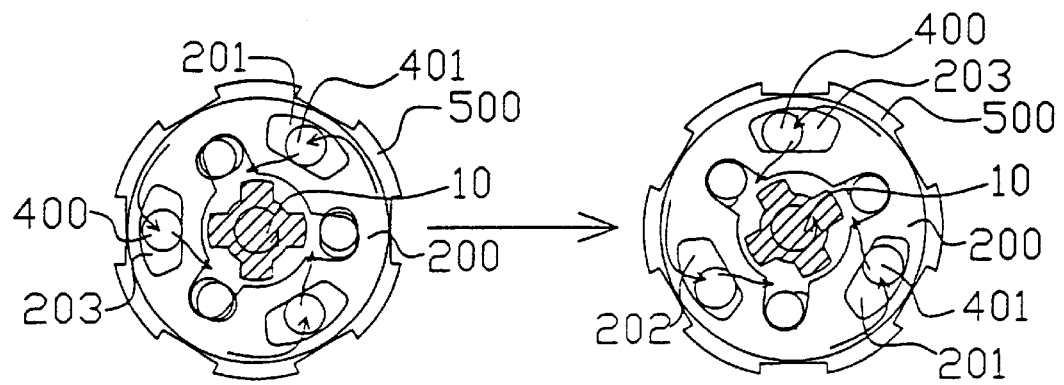
FIG. 6   FIG. 7

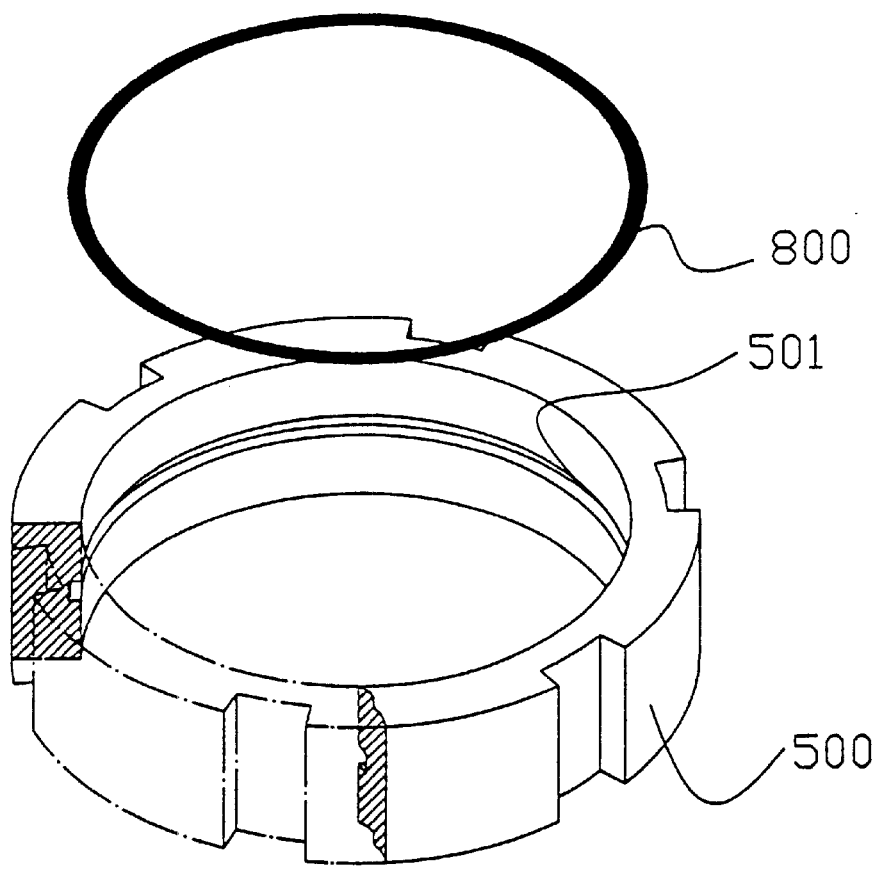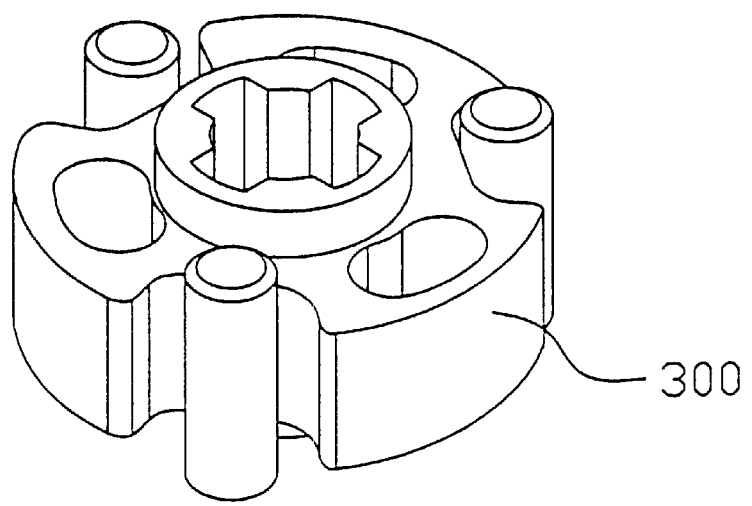
FIG. 8

POWERED, UNIDIRECTIONAL OUTPUT CONTROLLING APPARATUS

CROSS-REFERENCE TO RELATED PATENT APPLICATIONS

This invention is a Continuation-in-part Application of U.S. patent application Ser. No. 09/484,235 filed Jan. 18, 2000, now U.S. Pat. No. 6,279,714.

BACKGROUND OF THE INVENTION (a) Field of the Invention

The present invention relates to a powered, unidirectional output controlling apparatus, and in particular to an electric powered tool requiring no internal electric power to drive the main shaft to rotate.

(b) Prior Art

Electric powered tools, such as electric screwdrivers, or electric drills, improve the effectiveness and conveniences in work done. However, not all work can be done rapidly with these electric powered tools. For instance, these tools are not suitable for fine adjustment of screws, or loosening screws through one or two rotations, or drilling a small hole on a surface, etc. These work operations require manually operable tools. Recently, manufacturers have incorporated the advantages of a manual tool into an electrically powered tool by adding a connection member to connect the main shaft of the tool with the tool housing. However, such tools require an actuating component which requires manually triggering in order to provide a locking action. Although the main shaft can be locked and the reverse resistance of the engaged housing will not be reversely transmitted to the power source, such does cause the power source to drive without loading, and there are drawbacks when it is used.

These drawbacks of the conventional devices are as follows:
(1) The actuating components have to be triggered manually and therefore a triggering handle has to extend from the tool housing, while the rest of the components are mounted within the tool housing. Thus, the assembling of components is difficult and troublesome.
(2) The actuating end of the actuating component can easily be worn out after a period of utilization. This will lower the locking force, which causes a lowering of transmission force.
(3) The manufacturing of the tool housing is difficult for the reason that a hole for the triggering handle has to be made.
(4) The inner and external sides of the engaging device are locked and cannot be driven. Thus, the motor cannot drive the main shaft. It can only be driven if the engaging function of the engaging device is released.

The above drawbacks are overcome by providing a powered, unidirectional output controlling apparatus.

SUMMARY OF THE INVENTION

Accordingly, it is an object of the present invention to provide a powered, unidirectional output controlling apparatus, which is an electrically powered tool used to drive the main shaft to drive without using internal power of the apparatus. In accordance with the present invention, the actuating component step does not require manual triggering to hold the housing of the apparatus, such that the main shaft and the housing are engaged to form a manually operated tool. In manual operation, the reverse resistance transmitted from the tool only engages the housing, and will not be reversely transmitted to the power source, which causes no-load rotation of the motor. Further, the manual triggering of the apparatus is not required and therefore no triggering handle is formed at the housing which causes difficulty in the assembly of components.

Another object of the present invention is to provide a powered, unidirectional output controlling apparatus, wherein the flat bottom face of the locking slot can push the locking roller to engage the narrow space at a lateral end of the locking slot.

Yet another object of the present invention is to provide a powered, unidirectional output controlling apparatus, wherein the manufacturing of the tool housing is simple and the cost of production is low.

Yet a further object of the present invention is to provide a powered, unidirectional output controlling apparatus, wherein an elastic disc, made from a rubber material, in association with an O-ring fitted in an annular groove of the fixing ring, can be used to absorb the inertial impact force resulting form reverse transmission.

One aspect of the present invention is to provide powered, unidirectional output controlling apparatus mounted between the main shaft of an electric powered tool and a power source, characterized in that the apparatus comprises a rotating seat, a plurality of flexible disc seats made from a rubber material, a locking seat, a plurality locking rollers and a fixing ring. One end of the rotating seat is engaged with the power source output of a power transmission mechanism and the other end of the rotating seat is provided with a plurality of insertion shafts passing through the locking seat fastened by two flexible disc seats. The locking seat is first mounted into the fixing ring. The center of the rotating seat is provided with a bolt hole for the mounting with the main shaft. The external edge of the fixing ring is secured to the electric powered tool housing, and a perimeter portion of the locking seat is provided with a plurality of locking slots and the locking slots are mounted with a plurality of locking rollers. During reverse transmission, otherwise stated as during the manual application of torque to the housing, the flat bottom surfaces of the locking slots push the locking rollers to engage with the narrow space at the lateral end of the locking slots such that the locking rollers engage with the fixing ring and the locking seat.

BRIEF DESCRIPTION OF THE DRAWINGS

Other features and advantages of the present invention will become apparent in the following detailed description including drawings, all of which show a non-limiting form of the present invention, and in which:

FIGS. 4 and 5 are schematic views showing the unlocked operation of the powered, unidirectional output controlling apparatus of the present invention.

FIGS. 6 and 7 are schematic views showing the locking operation of the powered, unidirectional output controlling apparatus of the present invention.

FIG. 8 is an exploded view of a portion of the present invention.

DETAILED DESCRIPTION OF THE PREFERRED EMBODIMENT

Figure 1:
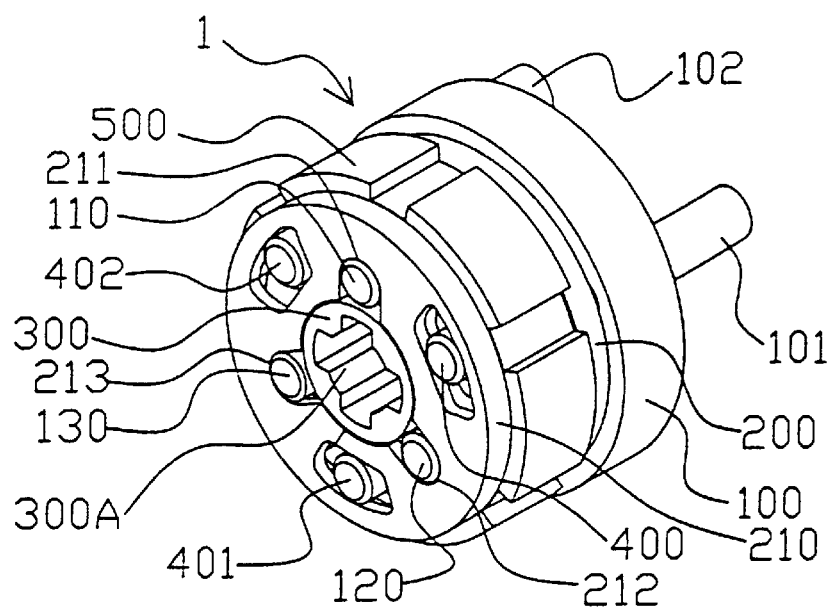
FIG. 1 is a perspective view of the powered, unidirectional output controlling apparatus of the present invention.
Figure 3:
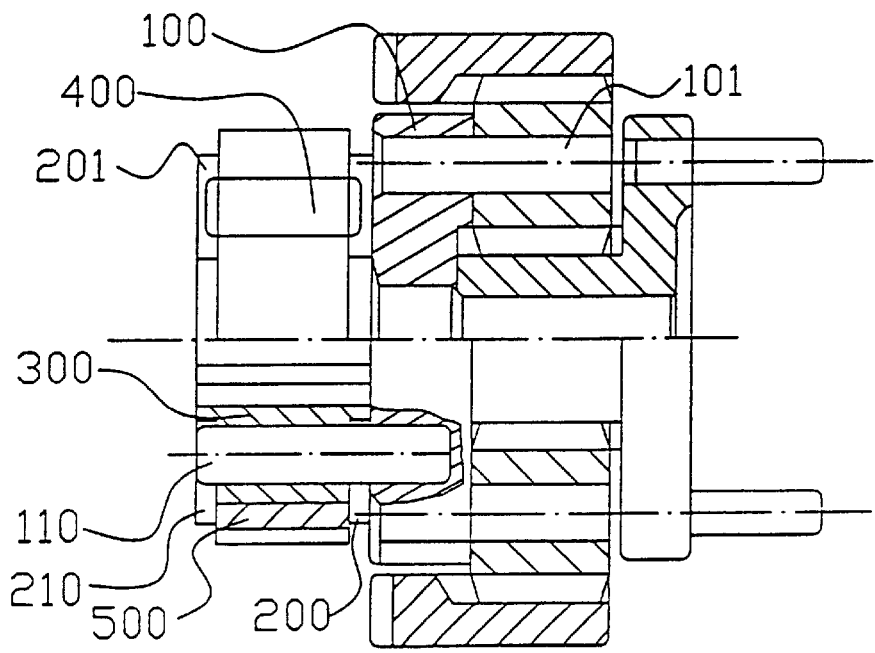
FIG. 3 is a sectional view of the powered, unidirectional output controlling apparatus of the present invention.
Figure 2:
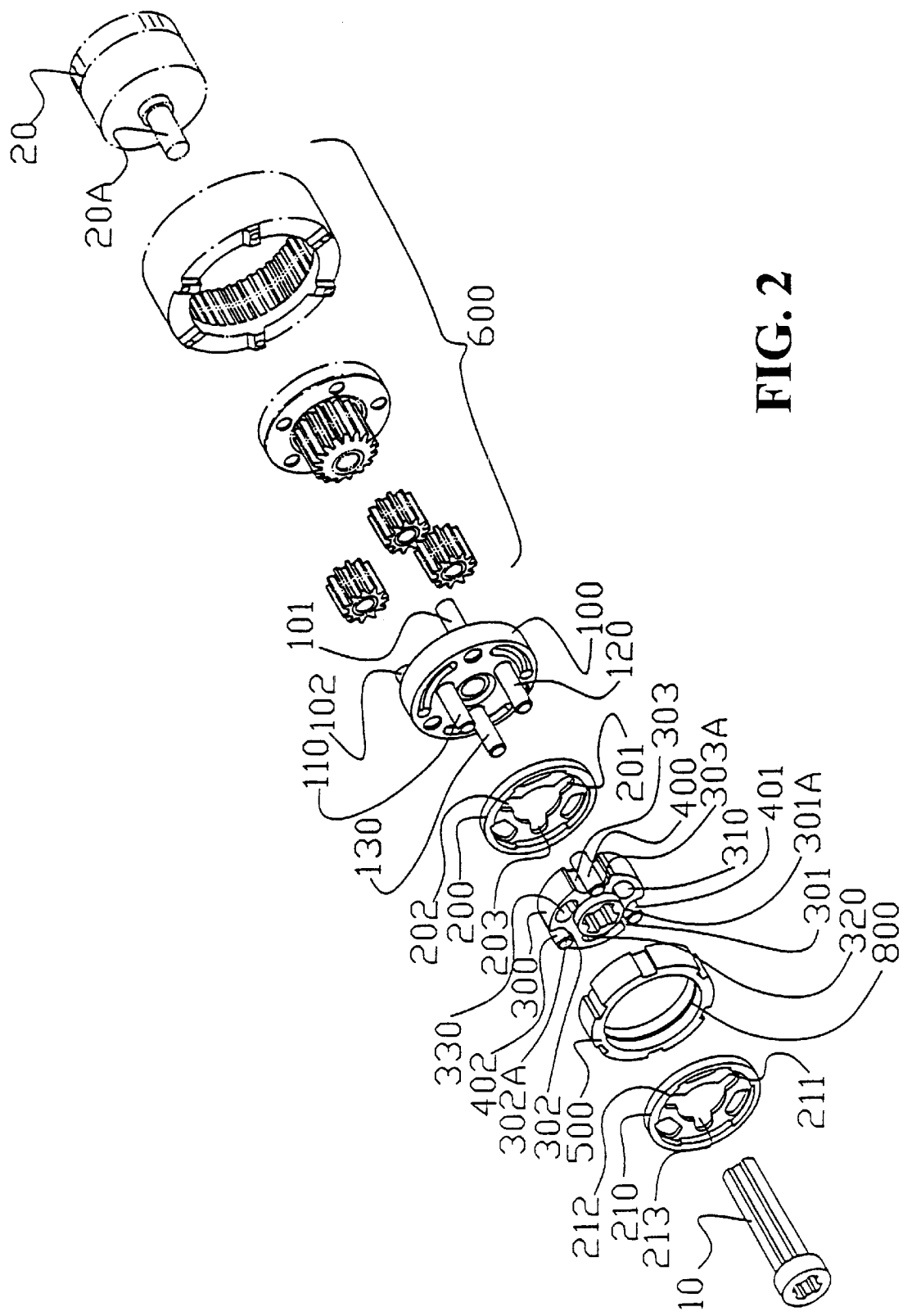
FIG. 2 is a perspective exploded view of the powered, unidirectional output controlling apparatus of the present invention.

Referring to FIGS. 1 to 3, there is shown a powered, unidirectional output controlling apparatus 1, which is to be mounted in between the main shaft 10 of an electric powered tool and a power source 20. The apparatus 1 comprises a rotating seat 100, two flexible disc seats 200, 210 made from a rubber material, a locking seat 300, a plurality of locking rollers 400, 401, 402 and a fixing ring 500. In accordance with the present invention, one end surface of the rotating seat 100 is provided with a plurality of axial shafts 101, 102 that are circularly arranged so as to engage with the power source output end 20A of the power transmission mechanism (as shown in FIG. 2, the power transmission mechanism 600 generally includes at least a planetary gear set and the axial shafts 101, 102 are used as gear shafts for the planetary gear). The other end surface of the rotating seat 100 is provided with a plurality of insertion shafts 110, 120, 130 passing through the flexible disc seat 200 to mount the locking seat 300 which is mounted within the fixing ring 500, and then, is mounted with the flexible disc seat 210 at the upper end of the fixing ring 500. The fixing ring 500 is formed, at the inner side thereof, with an annular groove 501 in which is fitted a rubber ring 800 for improving the capability of the apparatus to absorb the inertial impact force as a result of reverse transmission (see FIG. 8). In accordance with the present invention, the center of the seat surface of the locking seat 300 is provided with a bolt hole 300A for mounting with the main shaft 10. The external edge of the fixing ring 500 is engaged with the electric powered tool housing, and the surround of the locking seat 300 is provided with a plurality of locking slots 301, 302, 303 having flat bottom surfaces 301A, 302A, 303A. To each of the locking slots 301, 302, 303, a locking roller 400, 401, 402 is squeezed in, and on the flexible disc seats 200, 210, corresponding to the position of the insertion shafts 110, 120, 130, a plurality of circular holes 201, 202, 203, 211, 212, 213 are provided. On the locking seat 300, corresponding to the position of the insertion shafts 110, 120, 130,k a plurality of circular insertion holes 310, 320, 330 are provided, such that the insertion shafts 110, 120, 130 extend into the circular holes 201, 202, 203, 211, 212, 213 and the circular insertion holes 310, 320, 330. In accordance with the present invention, the flexible disc seats 200, 210, the locking seat 300 and the rotating seat 100 are stacked and connected.

When electric current is used in operation of a tool, as shown in FIGS. 4 and 5, the insertion shafts 110, 120, 130 passing through the locking seat 300 rotate the locking seat 300 and the flexible disc seats 200, 210. At this instance, the two flexible disc seats 200, 210 lightly press the locking rollers 400, 401, 402 onto the bottom surfaces 301A, 302A, 303A, thus, the locking rollers 400, 401, 402 are simultaneously driven to rotate. The locking rollers 400, 401, 402 will not lock with the narrow space 3011B, 301C, 302B, 302C, 303B, 303C at the lateral end of the locking slots 301, 302, 303 and cannot be rotated. The bolt hole 300A at the center section of the locking seat 300 drives the combined main shaft 10 so as to transfer the power. The components within the fixing ring 500 are rotated to produce displacement, except the fixing ring 500 mounted onto the electric powered tool hosing which cannot be driven to move. The bolt hole 300A drives the main shaft 10 of the electric power tool to do work.

When the power is not switched on, as shown in FIGS. 6 and 7 (from left to right), as the main shaft 10 is rotated, the bolt hole 300A drives the locking seat 300. At this instance, there are gaps formed between the insertion holes 310, 320, 330 and the insertion shafts 110, 120, 130, the rotating seat 100 and the two flexible disc seats 200, 210 cannot be driven simultaneously. That is, the locking rollers 400, 401, 402 cannot be driven simultaneously such that the bottom surfaces 301A, 302A, 303A of the locking seat 300 cause the locking rollers 400, 401, 402 to engage at the narrow space 301B, 301C, 302B, 302C, 303B, 303C at the lateral end of the locking slots, 301, 302, 303 such that the locking rollers 400, 401, 402 are positioned onto the fixing ring 500 causing the main shaft 10 unable to rotate. That is, the power transmission mechanism 600 and the power source cannot be driven to rotate.

In accordance with the present invention, the powered, unidirectional output controlling apparatus can prevent power from being reversely transmitted to the power source, and prevent no-load rotation of motor. The present apparatus can be easily assembled, and produced without lowering its power, and has low noise.

While a specific embodiment of the invention has been shown and described in detail to illustrate the present invention, it will be understood that the invention may be embodied otherwise without departing form the principles of the present invention.

I claim:

1. A powered, unidirectional output controlling apparatus mounted between a main shaft of an electrically powered tool and a power source, characterized in that the apparatus comprises a rotating seat, at least a pair of flexible disc seats made from a rubber material, a locking seat, a plurality of locking rollers and a fixing ring, one end of the rotating seat being engaged with an output of a power transmission mechanism of the power source, an opposing end of the rotating seat being provided with a plurality of insertion shafts passing through the locking seat fastened by the two flexible disc seats, the locking seat being first mounted into the fixing ring, a center of the rotating seat being provided with a bolt hole for mounting the main shaft, the fixing ring having an external edge portion secured to a housing of the electric powered tool, the locking seat having a perimeter portion provided with a plurality of locking slots formed therein, each of the locking slots having a flat bottom surface, the plurality of locking rollers being respectively mounted in the plurality of locking slots, thereby during manual rotation of housing, the flat bottom surfaces of the locking slots respectively push the locking rollers to engage with a narrow space at a lateral end of the locking slots such that the locking rollers engage with the fixing ring and the locking seat, wherein one end surface of the rotating seat is provided with a plurality of circularly arranged axial shafts to engage the output end of the power transmission mechanism, the two flexible disc seats each having a plurality of circular holes formed therein corresponding to a position of the insertion shafts, the locking seat having a plurality of insertion holes formed therein corresponding to the position of the plurality of insertion shafts, the insertion shafts being inserted into the circular holes and the insertion holes, the flexible disc seats and the locking seat being stacked together by the insertion shafts, and the fixing ring having an annular groove formed in an inner side thereof in which a rubber ring is fitted.

* * * * *